US011450197B2

(12) United States Patent
Wilson et al.

(10) Patent No.: US 11,450,197 B2
(45) Date of Patent: Sep. 20, 2022

(54) APPARATUS AND METHOD OF CONTROLLING A SECURITY SYSTEM

(71) Applicant: ShopperTrak RCT Corporation, Chicago, IL (US)

(72) Inventors: Matthew W. Wilson, Chicago, IL (US); Daniel Mueller, Chicago, IL (US); Michelangelo Palella, Bartlett, IL (US); Adam S. Bergman, Boca Raton, FL (US)

(73) Assignee: SHOPPERTRAK RCT CORPORATION, Chicago, IL (US)

( * ) Notice: Subject to any disclaimer, the term of this patent is extended or adjusted under 35 U.S.C. 154(b) by 0 days.

(21) Appl. No.: 16/783,043

(22) Filed: Feb. 5, 2020

(65) Prior Publication Data

US 2020/0250958 A1     Aug. 6, 2020

Related U.S. Application Data

(60) Provisional application No. 62/801,566, filed on Feb. 5, 2019.

(51) Int. Cl.
*G08B 25/00* (2006.01)
*G08B 26/00* (2006.01)
(Continued)

(52) U.S. Cl.
CPC ......... *G08B 25/001* (2013.01); *G08B 25/002* (2013.01); *G08B 26/00* (2013.01);
(Continued)

(58) Field of Classification Search
CPC ..... G08B 31/00; H04W 12/122; H04L 63/302
See application file for complete search history.

(56) References Cited

U.S. PATENT DOCUMENTS 9,551,781 B2    1/2017   Baxley et al.
9,625,564 B2    4/2017   Baxley et al.
(Continued)

FOREIGN PATENT DOCUMENTS

EP      3327609        5/2018
WO      2017151631 A1  9/2017

OTHER PUBLICATIONS

International Search Report and Written Opinion issued in corresponding PCT/US2020/016891 dated Apr. 30, 2020.

*Primary Examiner* — John A Tweel, Jr.
(74) *Attorney, Agent, or Firm* — Arentfox Schiff LLP (57) ABSTRACT

Example implementations include a method, apparatus and computer-readable medium of controlling a security system by a computer device, comprising receiving device metadata associated with a device in communication with a wireless communication access point. The implementations further include determining that the device metadata comprises matched device metadata based on a match with one of a plurality of previously-identified device metadata in a historical database that stores the plurality of previously-identified device metadata in association with one or more of a plurality of security breach events and a corresponding one of a plurality of security breach probability values. Additionally, the implementations further include determining that the matched device metadata corresponds with a security breach probability value that exceeds a security breach probability threshold. Additionally, the implementations further include generating an alert and sending the alert to a security system device, wherein the alert is configured to initiate a security function.

15 Claims, 6 Drawing Sheets

(51) Int. Cl.
  *G08B 31/00* (2006.01)
  *H04W 80/02* (2009.01)
  *H04W 12/63* (2021.01)
  *H04L 9/40* (2022.01)

(52) U.S. Cl.
  CPC ............ *G08B 31/00* (2013.01); *H04L 63/302* (2013.01); *H04W 12/63* (2021.01); *H04W 80/02* (2013.01)

(56) References Cited

U.S. PATENT DOCUMENTS

| | | |
|---|---|---|
| 9,739,868 B2 | 8/2017 | Baxley et al. |
| 9,880,256 B2 | 1/2018 | Baxley et al. |
| 9,945,928 B2 | 4/2018 | Baxley et al. |
| 2014/0254890 A1 | 9/2014 | Bergman et al. |
| 2018/0191848 A1 | 7/2018 | Bhattacharya et al. |
| 2020/0128036 A1* | 4/2020 | Sarzynski ............... H04L 67/22 |

* cited by examiner

FIG. 6 ated with a device in communication with a wireless communication access point. The instructions are further executable to determine, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-

APPARATUS AND METHOD OF CONTROLLING A SECURITY SYSTEM

CLAIM OF PRIORITY

The present application for patent claims priority to U.S. Provisional Application No. 62/801,566 filed Feb. 5, 2019, which is assigned to the assignee hereof and hereby expressly incorporated by reference.

TECHNICAL FIELD

The present disclosure relates generally to computing systems. More particularly, the present disclosure relates to implementing systems and methods for controlling a security system.

BACKGROUND

Today there is no way to track or identify when a device has entered a store, where the device is associated with a person(s) who has previously stolen an item. Because of this fact, retailers and organizations are forced to profile based on preexisting identifiers of customers regardless of if they have been caught stealing anything in the past. As such, existing systems may be highly inaccurate and may have a high number of false positive notifications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of controlling a security system by a computer device, comprising receiving, at a processor of the computer device, device metadata associated with a device in communication with a wireless communication access point. The method further includes determining, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values. Additionally, the method further includes determining, by the processor of the computer device, that the matched device metadata corresponds with a security breach probability value of the plurality of security breach probability values that exceeds a security breach probability threshold. Additionally, the method further includes generating an alert in response to determining that the matched device metadata corresponds with a security breach probability value that exceeds a security breach probability threshold. Additionally, the method further includes sending the alert to a security system device, wherein the alert is configured to initiate a security function.

Another example implementation includes an apparatus for controlling a security system by a computer device, comprising a memory and a processor in communication with the memory. The processor is configured to receive, at a processor of the computer device, device metadata associated with a device in communication with a wireless communication access point. The processor is further configured to determine, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values. Additionally, the processor further configured to determine, by the processor of the computer device, that the matched device metadata corresponds with a security breach probability value of the plurality of security breach probability values that exceeds a security breach probability threshold. Additionally, the processor further configured to generate an alert in response to determining that the matched device metadata corresponds with a security breach probability value that exceeds a security breach probability threshold. Additionally, the processor further configured to send the alert to a security system device, wherein the alert is configured to initiate a security function.

Another example implementation includes an apparatus for controlling a security system by a computer device, comprising means for receiving, at a processor of the computer device, device metadata associated with a device in communication with a wireless communication access point. The apparatus further includes means for determining, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values. Additionally, the apparatus further includes means for determining, by the processor of the computer device, that the matched device metadata corresponds with a security breach probability value of the plurality of security breach probability values that exceeds a security breach probability threshold. Additionally, the apparatus further includes means for generating an alert in response to determining that the matched device metadata corresponds with a security breach probability value that exceeds a security breach probability threshold. Additionally, the apparatus further includes means for sending the alert to a security system device, wherein the alert is configured to initiate a security function.

Another example implementation includes a computer-readable medium computer-readable medium comprising stored instructions of controlling a security system by a computer device, executable by a processor to receive, at a processor of the computer device, device metadata associated with a device in communication with a wireless communication access point. The instructions are further executable to determine, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values. Additionally, the instructions are further executable to determine, by the processor of the computer device, that the matched device metadata corresponds with a security breach probability value of the plurality of security breach probability values that exceeds a security breach probability threshold. Additionally, the instructions are further executable to generate an alert in response to determining that the matched device metadata corresponds with a security breach probability value that exceeds a security breach probability threshold. Additionally, the instructions are further executable to send the alert to a security system device, wherein the alert is configured to initiate a security function.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure provides apparatus and methods for collecting device metadata, comparing the device metadata of previously-identified device metadata associated with one or more security events, and generating an alert based on a match and/or based on the matched device metadata corresponding to a threshold probability of being associated with a security event. Additionally, the disclosure may include performing a security function within a security system in response to the alert.

In an implementation, the present disclosure provides improved solution for loss prevention, such as in a retail environment, based on unique techniques for generating the alert in a manner that improves accuracy and avoids false positives. Additionally, the present disclosure provides a simple and efficient solution that is highly scalable, which overcomes issues with prior solutions. Finally, the present disclosure provides improvements in the functionality and operation of a security system, thereby improving security within a location.

Figure 1:
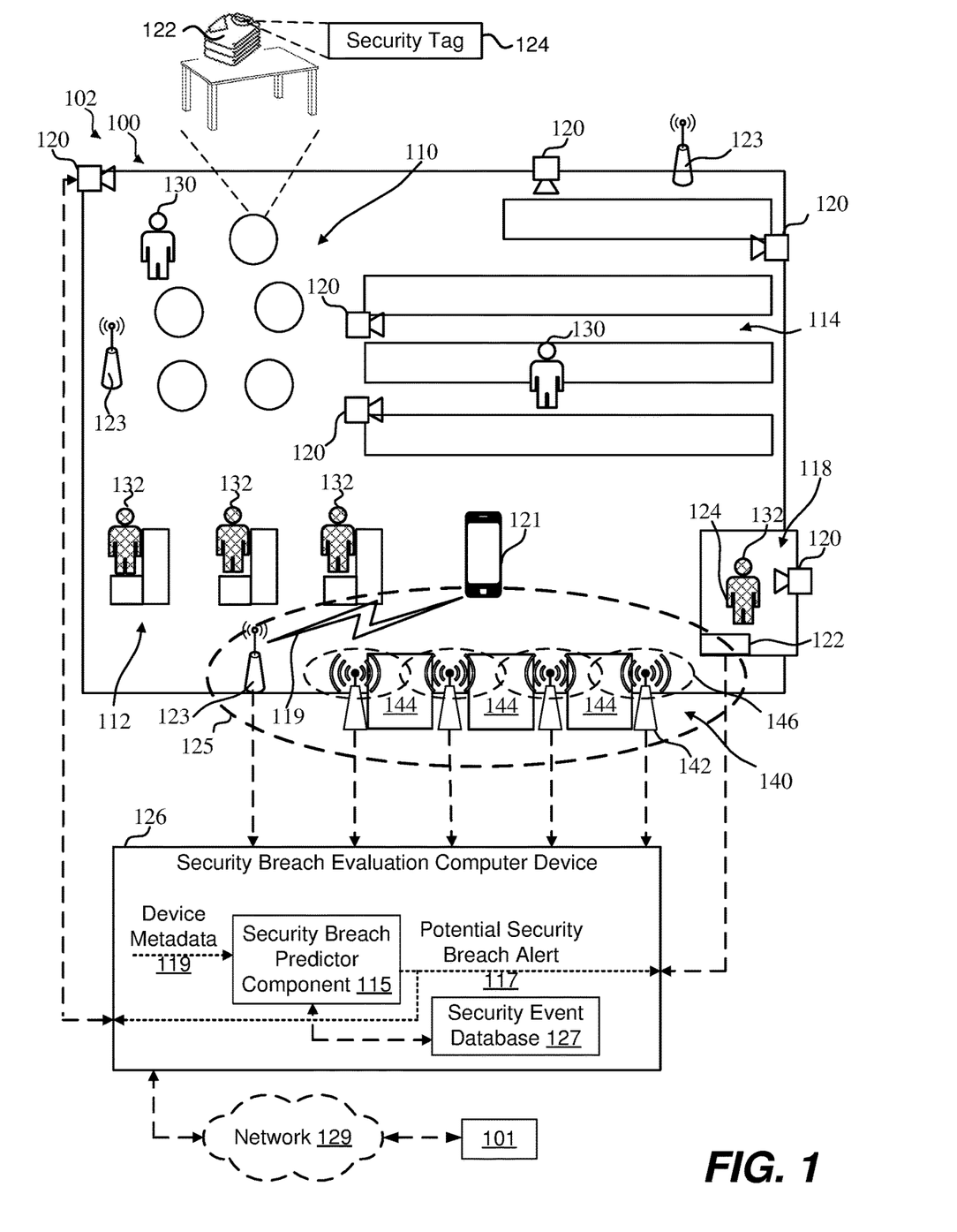
FIG. 1 is a schematic diagram of an example retail location including a first example of a security system and an example security breach evaluation computer device.

Referring now to FIG. 1, an example retail location 100 includes a security breach evaluation computer device 126 having a security breach predictor component 115 configured to be in communication with and control operation of a security system 102 in response to a potential security breach alert 117. In particular, the security breach predictor component 115 is configured to generate the potential security breach alert 117 based on comparing device metadata 119 of a device 121 in communication with or otherwise detected by a wireless access point 123 to previously-identified device metadata associated with previous security events stored in a security event database 127. For instance, the wireless access point 123 may be any type of wireless communication device, such as a router or a modem, and the wireless access point 123 may communicate using one or more of a plurality of communication protocols, such as a wireless local area network (WLAN) protocol (e.g., 802.11 or Wi-Fi), Bluetooth protocol, Zigbee protocol, or any other wireless protocol. Further, the wireless access point 123 may be located or configured to have a coverage area 125 overlapping with one or more entry or exit locations (hereinafter referred to as entry/exit 140) in order to collect the device metadata 119 as the device 119 enters or exits the retail location 100. Also, in some implementations, additional wireless access points 123 may be located at one or more additional positions throughout the retail location 100 to collect additional transmissions of the device metadata 119, for example, to track movement of the device 121 through the retail location 100 (e.g., via triangulation or via determining a distance to an individual access point, for instance based on using received signal strength indication values) and/or to identify a position of the device 121 at a time corresponding to a security event, such as detection of a security tag 124 attached to an item 122 being detected by an exit system 140, thereby indicating a potential theft of the item 122.

Additionally, the potential security alert 117 may be communicated to one or more security devices within the security system 102, for example, to track movement of the device 121, acquire images, generate notifications on other security devices (e.g., computer devices of security or store personnel), or perform one or more other security-related functions as described in more detail below.

Further, in some optional aspects, the security breach evaluation computer device 126 may be in communication, e.g., via a wired and/or wireless network 129 such as the Internet, with one or more other retail locations 101 so as to share security events, associated device metadata 119, and/or other security event database information 127. The security breach evaluation computer device 126 may be, for example, any mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing exist system measurements. It should be noted that security breach evaluation computer device 126, or portions thereof such as security breach predictor component 115 and/or security event database 127, may be located remotely from the retail location 100, such as in server and/or other retail location 101 located across the network 129 and/or in a cloud infrastructure.

The retail location 100 may include one multiple regions where tagged products may be located. For example, the retail location 100 may include an open display area 110, a front end 112, aisles 114, and a security room 118. Customers 130 may be located within the different regions or zones within the store and/or immediately outside the store. Workers 132 may be stationed at locations such as check out registers and the security room 118. A person of skill in the art would understand that the disclosed systems and methods are applicable to a variety of retail locations and the present disclosure is not limited to the example retail location or areas.

As discussed above, retailers (e.g., apparel retailers) have deployed security systems, such as EAS and/or RFID systems, in stores using security tags 124 to track product movements, such as when the products arrive at a store, are placed on display on the sales floor, and/or are sold. By adopting security tags 124, retailers may be able to reduce the amount of time that the store employees spend counting the inventory (e.g., manually counting inventor that is on the floor and in stock room), as well as increase merchandise visibility within each store, thereby enabling shoppers in the store and online to find what they seek. Security systems may use different frequency signals to read and capture information stored on a tag attached to an object such as a good, product, or merchandise. For example, security tags 124 may be used with a security system to detect inventory changes and/or possible loss events. For example, one or more security tags 124 may be read by an exit system to determine whether a tagged item 122 is exiting the retail location 100. For instance, the security tag 124 can be read from up to several feet away and does not need to be within direct line-of-sight of the reader to be tracked.

The security system 102 may include one or more security tags or labels 124 (e.g., an EAS tag, RFID tag or dual tech tag) and a reader (e.g., exit system 140). Each security tag 124 may be embedded with at least one transmitter and at least one receiver, e.g., an EAS transmitter and EAS receiver, RFID transmitter and RFID receiver, or both. Each security tag 124 may further contain the specific serial number for each specific object (e.g., an electronic product code (EPC)). For example, in one implementation, the security tag 124 may include multiple memory banks such as a reserved memory, EPC memory, tag identification (TID) memory, and user memory. The reserved memory bank may include an access password and a kill password. The EPC memory may include the EPC, a protocol control, and a cyclic redundancy check value. The TID memory may include a tag identification. The user memory may store custom data.

To read the information encoded on a security tag 124, a two-way radio transmitter-receiver called an interrogator or reader (e.g., exit system 140) emits a signal to the security tag using one or more antennas, antenna panels or antenna arrays (e.g., internal antennas). The reader 140 may apply filtering to indicate what memory bank the security tag 124 should use to respond to the emitted signal. The security tag 124 may respond with the information (e.g., EPC value or serial number) written in the memory bank. The security tag data set may include any information stored on the security tag 124 as well as information about reading the security tag 124. For example, the security tag data set may include: a timestamp, a location, a signal transmission power, a received signal strength indication (RSSI), and an identifier of the reader 140. The security tag 124 may be a passive tag or a battery powered security tag. A passive security tag may use wave energy from the interrogator or the receiver 140 to relay the stored information back to the interrogator. In contrast, a battery powered security tag 124 may be embedded with a battery that powers the relay of information.

The security system 102 may include an exit system 140, multiple cameras 120, and a security breach evaluation computer device 126. The exit system 140 may include multiple sensors 142 located near entries/exits 144. The multiple sensors 142 may define an exit or point of exit. For example, the example retail location 100 may include three entries/exits 144 that are relatively narrow. The sensors 142 may be located on each side of the entries/exits 144. For example, in an implementation, the sensors 142 may include at least one security tag reader including an antenna that generates a tag detection field 146. Each security tag reader may be fixedly positioned with the sensor 142 or pedestal. For example, each security tag reader may be positioned or fastened to the sensor 142 or pedestal. Generally, the sensors 142 may be configured (e.g., by setting a power level) such that the tag detection fields 146 cover the entries/exits 144 to detect tags moving through the exits. Although the sensors 142 are illustrated as pedestals adjacent the entries/exits 144, sensors 142 may be located on the floor and/or the ceiling.

The cameras 120 may be located in or near the exit system 140 or may be located in other regions of retail location 100. Each camera 120 may be a digital video camera such as a security camera. The multiple cameras 120 may be located throughout the retail location 100. Each of the cameras 120 may provide a periodic, triggered, and/or constant video feed of one or more of the areas of the retail location 100. The cameras 120 may generally be oriented in a default direction to capture a particular view of the retail location 100 where activity is expected, but one or more of the cameras 120 may be mounted on a gimbal that allows rotation and panning of the respective camera 120. For example, the security system 102 may move a camera 120 to maintain the field of view of the camera 120 on a customer 130. In another aspect, the security system 102 may allow manual control over one or more cameras 120. In an aspect, the security system 102 may be integrated with one or more other systems, and the video feed of the cameras 120 may be used for multiple purposes.

Figure 2:
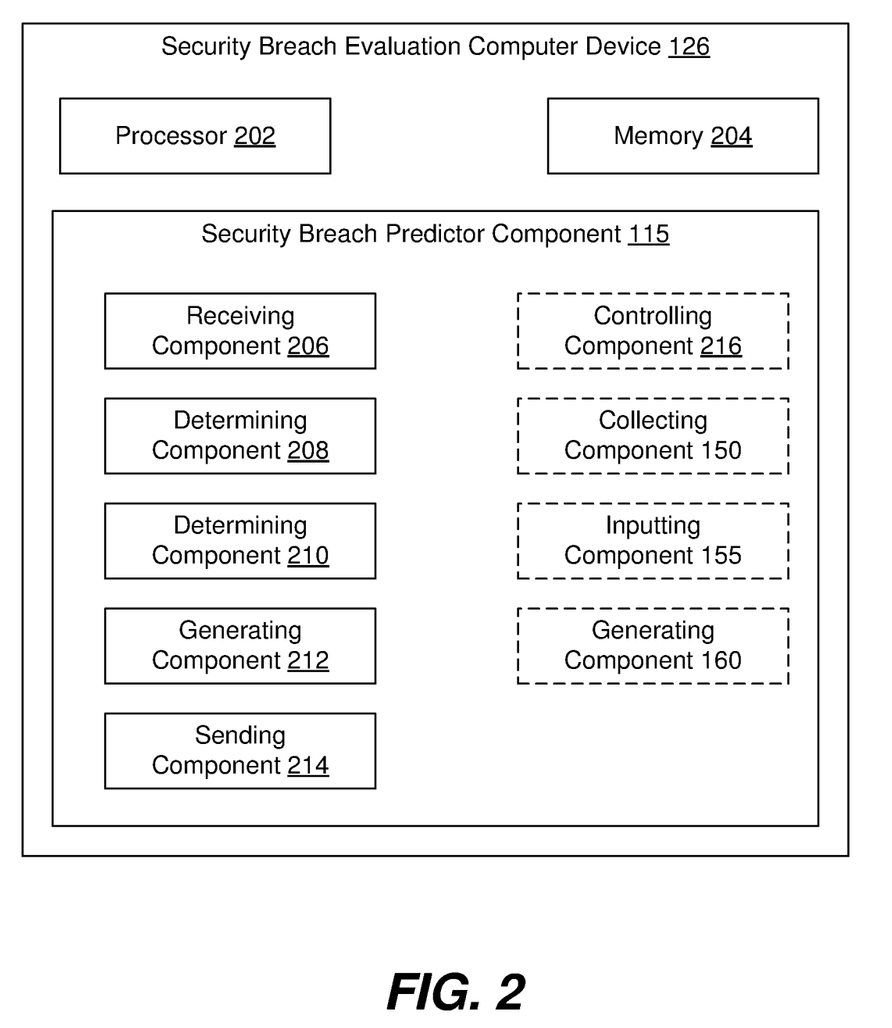
FIG. 2 is a schematic block diagram of an example computer device, in accordance with an implementation of the present disclosure.
Figure 3:
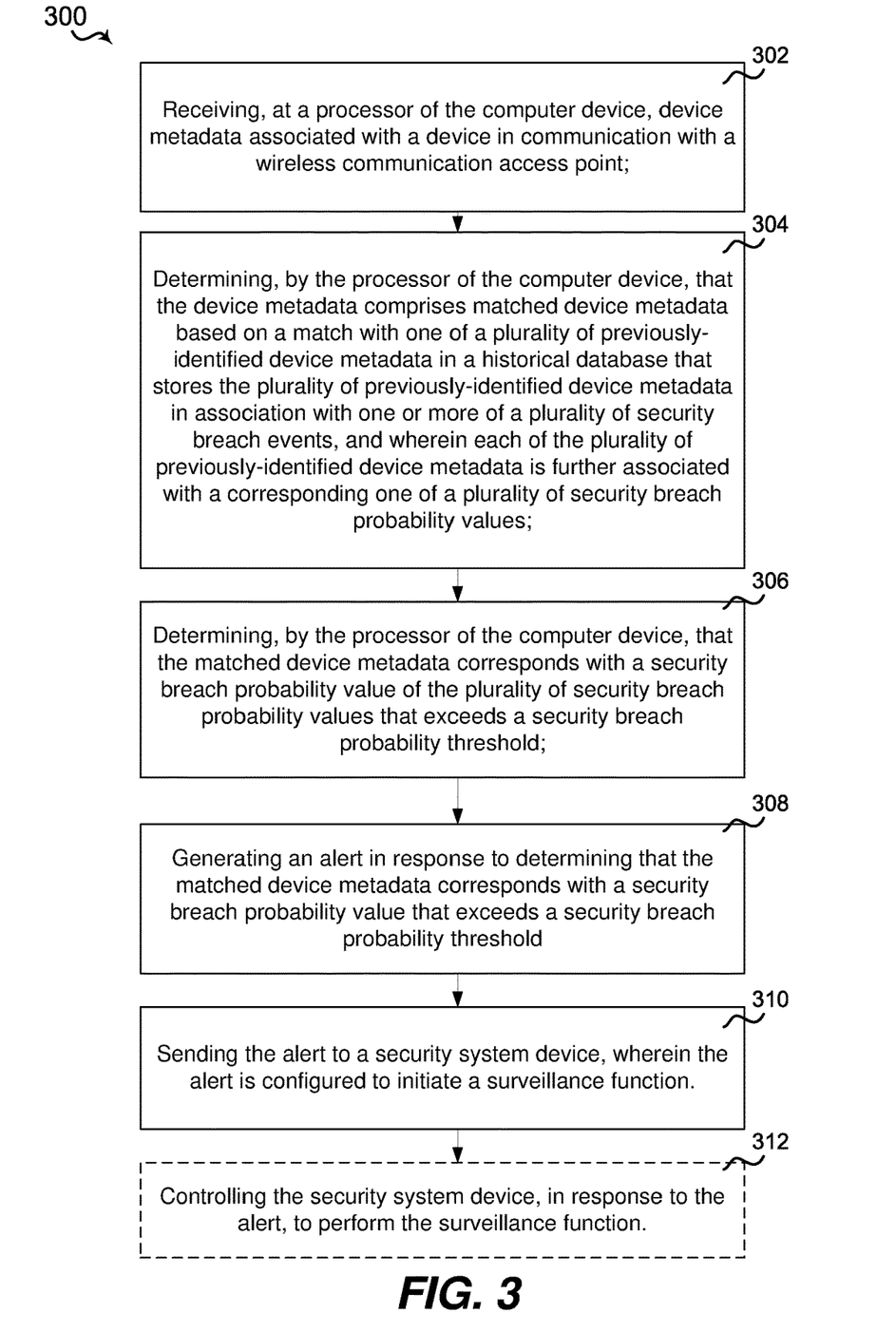
FIG. 3 is a flowchart of an example method of controlling a security system, in accordance with an implementation of the present disclosure.

Referring to FIGS. 2 and 3, in operation, the security breach evaluation computer device 126 may perform a method 300 of controlling a security system 102, by such as via execution of security breach predictor component 115 by processor 202 and/or memory 204.

At block 302, the method 300 includes receiving, at a processor of the computer device, device metadata associated with a device in communication with a wireless communication access point. For example, in an aspect, computer device 100, processor 202, memory 204, security breach predictor component 115, and/or receiving component 206 may be configured to or may comprise means for receiving, at a processor of the computer device, device metadata associated with a device in communication with a wireless communication access point.

For example, the receiving at block 302 may include receiving device metadata 119 such as, but not limited to, one or any combination of a medium access control address, a Wi-Fi-specific identifier, a fingerprint (e.g., a hashed value) of a set of information transmitted by the device, or a device-specific identifier.

Further, for example, the receiving at block 302 may be based on the receiving component 206, such as a wired or wireless interface and/or modem and/or transceiver, receiving a communication from the wireless communication access point 123, which may acquire the device metadata 119 based on executing communication protocols relating to the exchange of messages/signals with the device 121, which may be any type of wireless communication device. Such protocols may allow for the exchange of some device-specific metadata without establishing a communication session or connection between the wireless access point 123 and the device 121.

At block 304, the method 300 includes determining, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values. For example, in an aspect, computer device 100, processor 202, memory 204, security breach predictor component 115, and/or determining component 208 may be configured to or may comprise means for determining, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values.

For example, the determining at block 304 may include inputting the device metadata 119 into the determining component 208, which may include an algorithm or set of rules or machine learning model, or any combination of which, hereinafter referred to as a matching model, which may be configured to compare the device metadata 119 with the plurality of previously-identified device metadata stored in a historical database, e.g., the security event database 127, which stores the plurality of previously-identified device metadata in association with one or more of a plurality of security breach events and with a corresponding one of a plurality of security breach probability values to determine when a match exists. As used herein, a match may include an exact match or a likelihood of a match exceeding a predefined matching threshold. The value or level of the predefined matching threshold may be configurable by an operator of the system to weigh a higher or lower number depending on an amount of tolerance for potentially generating false positive matches.

At block 306, the method 300 includes determining, by the processor of the computer device, that the matched device metadata corresponds with a security breach probability value of the plurality of security breach probability values that exceeds a security breach probability threshold. For example, in an aspect, computer device 100, processor 202, memory 204, security breach predictor component 115, and/or determining component 210 may be configured to or may comprise means for determining, by the processor of the computer device, that the matched device metadata corresponds with a security breach probability value of the plurality of security breach probability values that exceeds a security breach probability threshold.

For example, the determining at block 306 may include inputting the device metadata 119 into the determining component 210, which may include an algorithm or set of rules or machine learning model, or any combination of which, hereinafter referred to as a security breach prediction model, which may be configured to compare the security breach probability value of the matched device metadata 119 with security breach probability threshold and determine if the threshold is satisfied/exceeded. The security breach prediction model may take into account, for each of the plurality of previously-identified device metadata, at least one of a security breach count, a device location relative to an event location of a security breach event location, a movement path of the device, a repeated device movement pattern, a device direction of movement, or a corresponding identified device, or any other relevant factors in determining the security breach probability value of the matched device metadata 119 (and the other remaining ones of the plurality of security breach probability values associated with the other remaining ones of the plurality of previously-identified device metadata).

At block 308, the method 300 includes generating an alert in response to determining that the matched device metadata corresponds with a security breach probability value that exceeds a security breach probability threshold. For example, in an aspect, computer device 100, processor 202, memory 204, security breach predictor component 115, and/or generating component 212 may be configured to or may comprise means for generating an alert in response to determining that the matched device metadata corresponds with a security breach probability value that exceeds a security breach probability threshold.

For example, the generating at block 308 may include the generating component 212, which may be a part of the security breach prediction model, creating a data packet and/or payload for a data packet that includes an alert value and/or an alert command that defines the alert in response to the determination that the matched device metadata corresponds with a security breach probability value that exceeds a security breach probability threshold. The alert may be configured to initiate or trigger one or more security functions to control and/or modify an operation of the security system 102 based on the presence of the device 121 being predicted to relate to an imminent security event, such as an unauthorized attempt to remove item 122 from the retail location 100.

At block 310, the method 300 includes sending the alert to a security system device, wherein the alert is configured to initiate a security function. For example, in an aspect, computer device 100, processor 202, memory 204, security breach predictor component 115, and/or sending component 214 may be configured to or may comprise means for sending the alert to a security system device, wherein the alert is configured to initiate a security function.

For example, the sending at block 310 may include the sending component 214, which may be a wired or wireless interface, modem, transceiver, etc., transmitting to alert to the security system 102 and/or one or more security devices within the security system 102.

In an optional aspect, at block 312, the method 300 may further include controlling the security system device, in response to the alert, to perform the security function. For example, in an aspect, computer device 100, processor 202, memory 204, security breach predictor component 115, and/or controlling component 216 may be configured to or may comprise means for controlling the security system device, in response to the alert, to perform the security function.

For example, the controlling at block 312 may include the alert initiating or triggering the controlling component 216 (which in some aspects may be a separate component with the security system 102 or within a security device within the security system 102) to perform a security function. For instance, the security function may include, but is not limited to, at least one of tracking movement of the device, capturing an image in a location of the device, transmitting a notification to the device, or transmitting a notification to another security system device.

Further, for example, the controlling at block 312 may be performed by camera (or video) devices, wireless access points, and/or other sensors or security devices within the security system 102.

Figure 4:
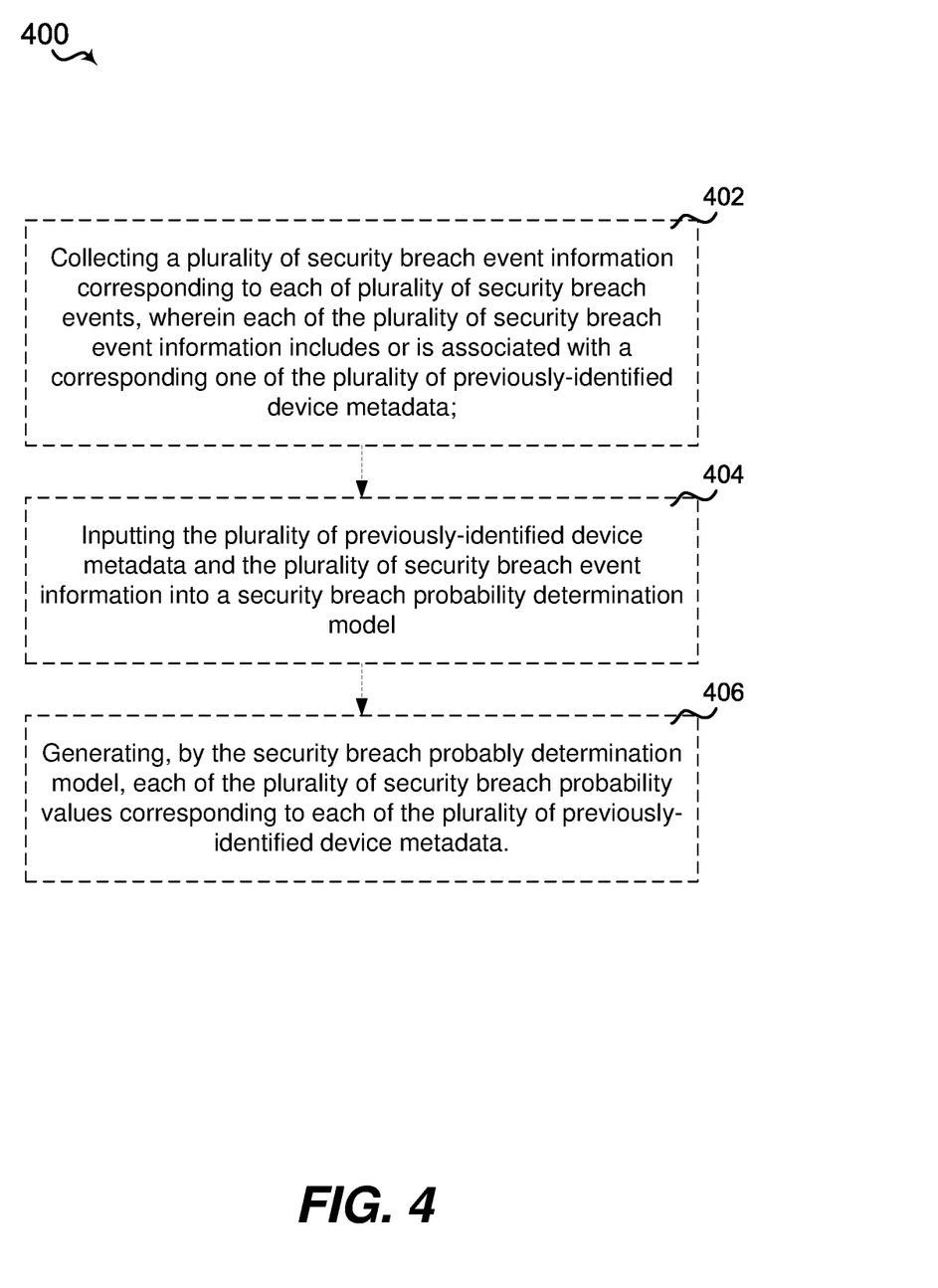
FIG. 4 is a flowchart of optional aspects of the method of controlling the security system of FIG. 3.

Referring to FIG. 4, in an optional aspect, at block 402, the method 300 may further include collecting a plurality of security breach event information corresponding to each of plurality of security breach events, wherein each of the plurality of security breach event information includes or is associated with a corresponding one of the plurality of previously-identified device metadata. For example, in an aspect, computer device 100, processor 202, memory 204, security breach predictor component 115, and/or collecting component 218 may be configured to or may comprise means for collecting a plurality of security breach event information corresponding to each of plurality of security breach events, wherein each of the plurality of security breach event information includes or is associated with a corresponding one of the plurality of previously-identified device metadata.

For example, the collecting at block 402 may include the collecting component 218, which may be a part of the security breach prediction model, obtaining the additional information from other retail locations 101.

In this optional aspect, at block 404, the method 200 may further include inputting the plurality of previously-identified device metadata and the plurality of security breach event information into a security breach probability determination model. For example, in an aspect, computer device 100, processor 202, memory 204, security breach predictor component 115, and/or inputting component 220 may be configured to or may comprise means for inputting the plurality of previously-identified device metadata and the plurality of security breach event information into a security breach probability determination model.

For example, the inputting at block 404 may include the inputting component 220, which may be a part of the security breach prediction model, adding the additional information from other retail locations into the model in order to improve an accuracy and/or efficiency or scale of the model.

In this optional aspect, at block 406, the method 200 may further include generating, by the security breach probability determination model, each of the plurality of security breach probability values corresponding to each of the plurality of previously-identified device metadata. For example, in an aspect, computer device 100, processor 202, memory 204, security breach predictor component 115, and/or generating component 222 may be configured to or may comprise means for generating, by the security breach probability determination model, each of the plurality of security breach probability values corresponding to each of the plurality of previously-identified device metadata.

For example, the generating at block 406 may include the generating component 222, which may be a part of the security breach prediction model, computing or outputting the security breach probability value associated with each of the plurality of previously-identified device metadata based on executing the algorithms, rules, machine learning model(s), etc., of the security breach predictor component 115.

Figure 5:
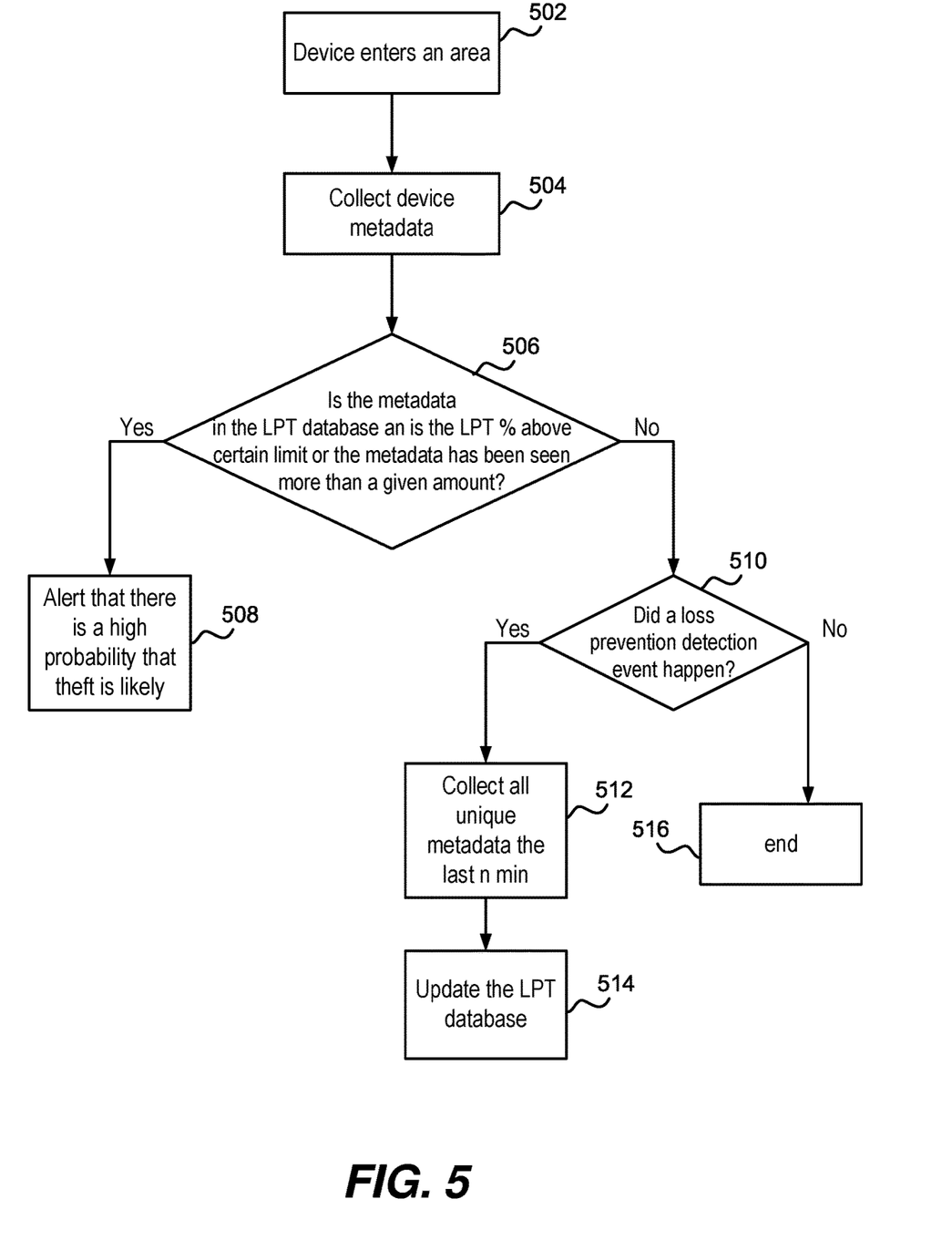
FIG. 5 is a flowchart of an example implementation of the method of FIG. 3.

Referring to FIG. 5, in an implementation of the method of FIGS. 3 and 4, a method 500 of controlling a security system may relate to a system for loss prevention tracking with data related to devices that emit Wi-Fi metadata along with predicting loss prevention detection events. These systems and methods may be referred to as LPT (Loss Prevention Tracking). An aspect of the present disclosure concerns implementing systems and methods for tracking and identifying person(s) who have previously stolen an item at a given store. The methods comprise of: Tracking metadata associated with a device that emits a Wi-Fi signal that enter a given area, tracking metadata associated with a device that emits a Wi-Fi signal in a given area(s) of a store after a loss prevention event detection is detected and alerting when metadata associated with a device that emits a Wi-Fi signal is identified as being present when the loss prevention event has been detected.

For example, in an implementation, at 502, the method 500 includes a device entering an area(s) where LPT is set up.

At 504, if the device emits Wi-Fi metadata, the metadata is captured and stored in a database including the hashed mac address of the device that emits Wi-Fi, the date/time the hashed mac address was seen and the signal strength of the device that is emitting this data. The signal strength is used to determine how far away the device is from a device that can read Wi-Fi metadata.

At 506, a check of the LPT database will happen every time a new metadata is identified. This database lookup and/or check if the metadata identified has been captured where and when a loss prevention event detection is detected. The metadata would not be in the LPT database if the loss prevention detection event did not happen or the loss prevention detection event did happen and the metadata that was identified was not in the area(s) where and when a loss prevention event detection is detected.

At 508, if the metadata that is identified is in the LPT database and has been where and when a loss prevention event is detected more times than a given number of times or the LPT probability field that is in the LPT database is above a certain percentage, an alert would be triggered. This alert would indicate that a device that was present when and where the loss prevention detection was triggered has entered a given area(s).

At 510, depending on whether the loss prevention detection event occurs different actions are taken.

At 512, if the loss prevention detection event happens, then all unique metadata identified that have been in an area for a given amount of time where a loss prevention event is detected are taken from a different data source other than the LPT database.

All the unique metadata that were found are inserted or updated in the LPT database. If metadata is already in the LPT database then the number of times the identified metadata has been found when and where loss prevention event is detected is updated along with a percent of likely prior theft associated with the metadata.

At 516, if the loss prevention detection event does not happen, then the process ends.

An aspect of this disclosure relates to a way to capture data related to devices that emits Wi-Fi metadata, when in a given area(s) or location. Another aspect of this disclosure relates to a loss prevention event detection system that can send requests to an external computer(s). An alternative or additional aspect of this disclosure relates to a database that holds information about all previous loss prevention detection events including data related to devices that emit Wi-Fi metadata that was detected when the loss prevention event was detected. This database may also contain a conditional probability of prior theft associated with all or some data related to devices that emit Wi-Fi metadata captured when the loss prevention event has been detected.

Accordingly, in an implementation, the present solution may reduce shrinkage within a store by identifying person(s) that, have previously have or attempted to steal item(s). This is a cross product solution that could decreases the amount of shrink in a store. For instance, using Wi-Fi sniffing, real time positioning, beacon placement and sensors it is possible to attach a conditional probability of prior theft to a phone mac address and send an alert when that mac address is detected within a zone or area of the store. When an alarm goes off, an application would capture all mac address within the zone in the last n seconds. When the alarm goes off again, a check of mac addresses of all previous lists will be searched and cross checked, and a conditional probability of prior theft would be attached to the mac address. If x % conditional probability of a given mac is reached and that mac address is detected within a zone the store would be notified and further surveillance can occur. All of this would happen in real time. For this to achieve the goal of reducing shrink it would require the store staff to act quickly and have a proper procedure in place. In other implementations, instead of using mac addresses one could use video or any number of detection methods.

Figure 6:
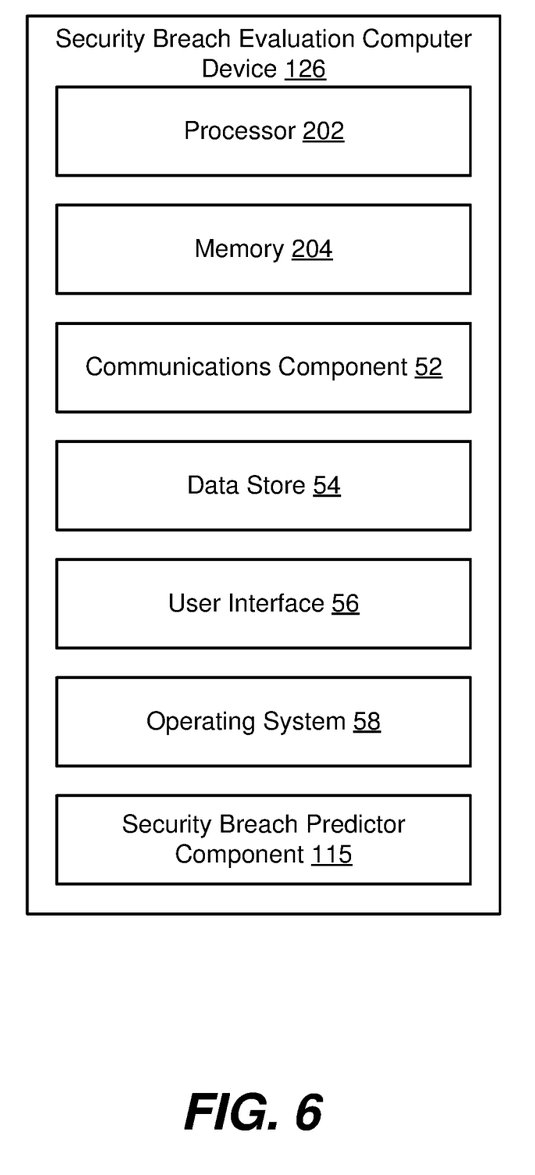
FIG. 6 is a block diagram of additional aspects of the security breach evaluation computer device of FIG. 1.

Referring now to FIG. 6, an example security breach evaluation computer device 126 includes additional component details as compared to the prior figures. The security breach evaluation computer device 126 may be an example of the evaluation computer 126 of FIG. 1. In one example, security breach evaluation computer device 126 may include processor 202 for carrying out processing functions associated with one or more of components and functions described herein. Processor 202 can include a single or multiple set of processors or multi-core processors. Moreover, processor 202 can be implemented as an integrated processing system and/or a distributed processing system.

In an example, security breach evaluation computer device 126 may include memory 204 for storing instructions executable by the processor 202 for carrying out the functions described herein. In an implementation, for example, memory 204 may include memory 244. The memory 204 may include instructions for executing security breach predictor component 115 for executing the methods herein.

Further, security breach evaluation computer device 126 may include a communications component 52 that provides for establishing and maintaining communications with one or more parties utilizing hardware, software, and services as described herein. Communications component 52 may carry communications between components on security breach evaluation computer device 126, as well as between security breach evaluation computer device 126 and external devices, such as devices located across a communications network and/or devices serially or locally connected to security breach evaluation computer device 126. For example, communications component 52 may include one or more buses, and may further include transmit chain components and receive chain components associated with a transmitter and receiver, respectively, operable for interfacing with external devices.

Additionally, security breach evaluation computer device 126 may include a data store 54, which can be any suitable combination of hardware and/or software, that provides for mass storage of information, databases, and programs employed in connection with implementations described herein. For example, data store 54 may be a data repository for operating system 58 and/or security breach predictor component 115. The data store may include memory 204.

Security breach evaluation computer device 126 may also include a user interface component 56 operable to receive inputs from a user of security breach evaluation computer device 126 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 58 and/or security breach predictor component 115. In addition, processor 202 may execute operating system 58 and/or security breach predictor component 115, and memory 204 or data store 54 may store them.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of controlling a security system by a computer device, comprising:
    receiving, at a processor of the computer device, device metadata associated with a device in communication with a wireless communication access point;
    determining, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values;
    determining, by the processor of the computer device, that the matched device metadata corresponds with a security breach probability value of the plurality of security breach probability values that exceeds a security breach probability threshold;
    generating an alert in response to determining that the matched device metadata corresponds with a security breach probability value that exceeds a security breach probability threshold; and
    sending the alert to a security system device, wherein the alert is configured to initiate a security function.

2. The method of claim 1, further comprising:
    controlling the security system device, in response to the alert, to perform the security function.

3. The method of claim 2, wherein the security function includes at least one of tracking movement of the device, capturing an image in a location of the device, transmitting a notification to the device, or transmitting a notification to another security system device.

4. The method of claim 1, wherein receiving the device metadata associated with the device includes receiving one or any combination of a medium access control address, a Wi-Fi-specific identifier, a fingerprint of a set of information transmitted by the device, or a device-specific identifier.

5. The method of claim 1, further comprising:
collecting a plurality of security breach event information corresponding to each of plurality of security breach events, wherein each of the plurality of security breach event information includes or is associated with a corresponding one of the plurality of previously-identified device metadata;
inputting the plurality of previously-identified device metadata and the plurality of security breach event information into a security breach probability determination model; and
generating, by the security breach probability determination model, each of the plurality of security breach probability values corresponding to each of the plurality of previously-identified device metadata.

6. The method of claim 5, wherein the security breach probability determination model takes into account, for each of the plurality of previously-identified device metadata, at least one of a security breach count, a device location relative to an event location of a security breach event location, a movement path of the device, a repeated device movement pattern, a device direction of movement, or a corresponding identified device.

7. An apparatus for controlling a security system by a computer device, comprising:
a memory; and
a processor configured to:
receive device metadata associated with a device in communication with a wireless communication access point;
determine that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values;
determine that the matched device metadata corresponds with a security breach probability value of the plurality of security breach probability values that exceeds a security breach probability threshold;
generate an alert in response to determine that the matched device metadata corresponds with a security breach probability value that exceeds a security breach probability threshold; and
send the alert to a security system device, wherein the alert is configured to initiate a security function.

8. The apparatus of claim 7, wherein the processor is further configured to:
control the security system device, in response to the alert, to perform the security function.

9. The apparatus of claim 8, wherein the security function includes at least one of tracking movement of the device, capturing an image in a location of the device, transmitting a notification to the device, or transmitting a notification to another security system device.

10. The apparatus of claim 7, wherein to receive the device metadata associated with the device includes to receive one or any combination of a medium access control address, a Wi-Fi-specific identifier, a fingerprint of a set of information transmitted by the device, or a device-specific identifier.

11. The apparatus of claim 7, wherein the processor is further configured to:
collect a plurality of security breach event information corresponding to each of plurality of security breach events, wherein each of the plurality of security breach event information includes or is associated with a corresponding one of the plurality of previously-identified device metadata;
input the plurality of previously-identified device metadata and the plurality of security breach event information into a security breach probability determination model; and
generate, by the security breach probability determination model, each of the plurality of security breach probability values corresponding to each of the plurality of previously-identified device metadata.

12. The apparatus of claim 11, wherein the security breach probability determination model takes into account, for each of the plurality of previously-identified device metadata, at least one of a security breach count, a device location relative to an event location of a security breach event location, a movement path of the device, a repeated device movement pattern, a device direction of movement, or a corresponding identified device.

13. A non-transitory computer-readable medium comprising stored instructions of controlling a security system by a computer device, executable by a processor to:
receive, at a processor of the computer device, device metadata associated with a device in communication with a wireless communication access point;
determine, by the processor of the computer device, that the device metadata comprises matched device metadata based on a match with one of a plurality of previously-identified device metadata in a historical database that stores the plurality of previously-identified device metadata in association with one or more of a plurality of security breach events, and wherein each of the plurality of previously-identified device metadata is further associated with a corresponding one of a plurality of security breach probability values;
determine, by the processor of the computer device, that the matched device metadata corresponds with a security breach probability value of the plurality of security breach probability values that exceeds a security breach probability threshold;
generate an alert in response to determine that the matched device metadata corresponds with a security breach probability value that exceeds a security breach probability threshold; and
send the alert to a security system device, wherein the alert is configured to initiate a security function.

14. The method of claim 1, wherein the historical database associates each security breach event with the received device metadata for each device within a zone of the security breach event when the event was detected.

15. The method of claim 1, wherein the security breach event is theft of merchandise.

* * * * *